US006235221B1

(12) United States Patent
Suzuki et al.

(10) Patent No.: US 6,235,221 B1
(45) **Date of Patent: *May 22, 2001**

(54) MULTILAYER CERAMIC PART

(75) Inventors: Kazuaki Suzuki; Takahide Kurahashi; Hidenori Ohata, all of Chiba (JP)

(73) Assignee: TDK Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/315,156

(22) Filed: May 20, 1999

Related U.S. Application Data

(63) Continuation of application No. PCT/JP98/04208, filed on Sep. 18, 1998.

(30) Foreign Application Priority Data

Sep. 22, 1997 (JP) .................................................. 9-275175
Nov. 12, 1997 (JP) .................................................. 9-326909

(51) Int. Cl.$^{7}$ ............................ A01B 1/02; C04B 35/26; B32B 13/06; B32B 15/04

(52) U.S. Cl. ....................... 252/514; 252/62.57; 428/209; 428/210; 428/673

(58) Field of Search ................................ 252/514, 62.57; 428/673, 209, 210

(56) References Cited

U.S. PATENT DOCUMENTS

| | | | |
|---|---|---|---|
| 5,450,045 * | 9/1995 | Mivra et al. | 333/1.1 |
| 5,532,667 * | 7/1996 | Haertling et al. | 336/177 |
| 5,683,790 | 11/1997 | Suzuki et al. | 428/210 |

FOREIGN PATENT DOCUMENTS

| | | |
|---|---|---|
| 4-354314 | 12/1992 | (JP) . |
| 9-102410 | 4/1997 | (JP) . |
| 9-181412 | 7/1997 | (JP) . |

* cited by examiner

*Primary Examiner*—Mark Kopec
(74) *Attorney, Agent, or Firm*—Oblon, Spivak, McClelland, Maier & Neustadt, P.C.

(57) ABSTRACT

A multilayer ceramic part of the invention comprises an internal conductor layer and a ceramic layer which are formed by co-firing. The internal conductor layer is formed of an electrical conducting material containing silver as a main component, and the ceramic layer is formed of an yttrium-iron-garnet based oxide magnetic material with silver added thereto. Thus, the multilayer ceramic part can be fabricated in high yields, even when its size is much more smaller than that of a multilayer ceramic part fabricated until now.

7 Claims, 3 Drawing Sheets

MULTILAYER CERAMIC PART

This application is a continuation of PCT/JP98/04208 filed Sep. 18, 1998.

ART FIELD

The present invention relates to a multilayer ceramic part.

BACKGROUND ART

With recent breakthroughs in radio communications technologies, there is an increasing demand for electronic parts that can be used at high frequencies ranging from a few hundred MHz to a few GHz or greater. With size reductions of radio communications equipment such as portable telephones, there is also a strong demand for size, and cost reductions of high frequency-conscious electronic parts used with such equipment. To meet these requirements, multilayer ceramic parts are now manufactured by the application of a diversity of integration technologies.

A multilayer electronic part is obtained by co-firing a ceramic material that is an oxide magnetic material and a conductive material, and has one or two or more functions by itself. Such a multilayer electronic part is manufactured by laminating the ceramic and conductive materials one upon another by printing or sheet-making processes to form a laminate, and cutting the laminate according to the desired shape and size followed by firing, or firing the laminate followed by cutting according to the desired shape and size. If required, an external conductor is provided on the electronic part. Thus, this multilayer ceramic part has a structure comprising an internal conductor between ceramic layers. In general, a material such as Ag or Cu is used for an internal conductor suitable for high-frequencies, especially microwaves. With the above production method, however, it has been considered until now that the melting of the internal conductor should be prevented so as to achieve satisfactory properties, and so firing should be carried out at a temperature equal to or lower than the melting point of the internal conductor. Accordingly, it has been believed that a ceramic material fired at elevated temperatures cannot possibly be used in combination with an internal conductor-forming electrical conducting material having a low resistivity yet a low melting point, e.g., Ag, and Cu.

In this regard, the applicant has filed a Japanese patent application (JP-A 6-252618) to come up with a method wherein an internal conductor having a low melting point as mentioned above is formed in a ceramic material unsuitable for low-temperature firing. This is called a conductor melting method wherein an electrical conducting material to form an internal conductor is fired at a temperature that is equal to or higher than the melting point of the electrical conducting material and lower than the boiling point of the electrical conducting material, and solidifying the fired electrical conducting material in the process of cooling. According to this method, the grain boundary between metal grains formed upon the solidification of the molten electrical conducting material becomes as thin as can be regarded as vanishing substantially, and the asperity of the interface between the ceramic material and the internal conductor tends to become small, resulting in a decrease in the high-frequency resistance of the internal conductor and an increase in the Q value at a high-frequency region. Further, a low-cost electrical conducting material having a relatively low melting point, e.g., Ag, and Cu may be used for the internal conductor. Furthermore, it is possible to co-fire the ceramic material and the internal conductor. These are very favorable in view of productivity and cost.

DISCLOSURE OF THE INVENTION

With the above conductor melting method, however, voids are often formed in the internal conductor upon the solidification of the internal conductor material in the cooling process subsequent to the melting of the internal conductor material. This in turn causes the resistance value of the internal conductor to increase with a decrease in the Q value of the multilayer ceramic part. On very rare occasion, the internal conductor itself breaks due to the presence of such voids. When there are voids in the internal conductor, gases present in the voids expand under the influence of latent heat of solidification in the cooling process, resulting in cracking of the internal conductor material. This in turn gives rise to an yield drop. When a multilayer ceramic part is manufactured by the conductor melting method, therefore, it is required to inhibit the formation of voids in the internal conductor.

For the purpose of providing a high-quality conductive paste which can prevent formation of voids, and generation of cracking due to such voids, even when an internal conductor composed mainly of silver is co-fired with a ceramic material by the conductor melting method, and so improve productivity with cost reductions, and which has excellent electrical characteristics as well as a multilayer ceramic part obtained using such a conductive paste, the applicant has proposed in WO98/05045 such a conductive paste as mentioned below as well as a multilayer ceramic part comprising an internal conductor formed using this conductive paste.

That is, the above conductive paste is a conductive paste obtained by dispersing an electrical conducting material composed mainly of silver and a metal oxide in a vehicle. For the metal oxide, at least one oxide selected from Ga, La, Pr, Sm, Eu, Gd, Dy, Er, Tm and Yb oxides is used.

When a multilayer ceramic part is fabricated by using this conductive paste, i.e., by co-firing the conductive paste and a ceramic material by the conductor melting method, no voids are generated; the ceramic material is quite unlikely to crack. The resistivity of the conductor, too, is low. By use of this conductive paste, it is thus possible to fabricate a multilayer ceramic part of very excellent quality in high yields.

However, multilayer ceramic parts having such applications as mentioned above, too, are now increasingly required to be further reduced in size in conjunction with the demand for size reductions of mobile communications equipment in particular.

It is an object of the invention to provide a multilayer ceramic part which, albeit being reduced in size, 10 can be manufactured in high yields.

Such an object is achieved by the inventions defined below as (1) to (7).

(1) A multilayer ceramic part comprising an internal conductor layer and a ceramic layer which are formed by co-firing, wherein said internal conductor layer is formed of an electrical conducting material containing silver as a main component and said ceramic layer is formed of an yttrium-iron-garnet based oxide magnetic material with silver added thereto.

(2) The multilayer ceramic part according to (1), wherein said silver is added to said oxide magnetic material in an amount of up to 10% by weight.

(3) The multilayer ceramic part according to (2), wherein said silver is added to said oxide magnetic material in an amount of up to 5% by weight.

(4) The multilayer ceramic part according to any one of (1) to (3), wherein said internal conductor layer is formed by firing a conductive paste obtained by dispersing in a vehicle an electrical conducting material containing silver as a main component and further containing at least one metal oxide selected from a Ga oxide, an La oxide, a Pr oxide, an Sm oxide, an Eu oxide, a Gd oxide, a Dy oxide, an Er oxide, a Tm oxide, and a Yb oxide.

(5) The multilayer ceramic part according to (4), wherein said metal oxide is contained in an amount of 0.1 to 20 parts by weight per 100 parts by weight of said electrical conducting material.

(6) The multilayer ceramic part according to any one of (1) to (5), wherein a firing temperature is equal to or igher than a melting point of said electrical conducting material and lower than a boiling point of said electrical conducting material.

(7) The multilayer ceramic part according to any one of (1) to (6), which is a non-reversible circuit element.

ACTION AND EFFECT OF THE INVENTION

In the multilayer ceramic part of the invention comprising an internal conductor layer and a ceramic layer which are formed by co-firing, the internal conductor layer is formed of an electrical conducting material containing silver as a main component and the ceramic layer is formed of an yttrium-iron-garnet based oxide magnetic material with silver added thereto. Under the action of this silver, the formation of voids, etc. in the internal conductor layer is reduced as much as possible, resulting in an part yield improvement.

BEST MODE FOR CARRYING OUT THE INVENTION

Figure 1:
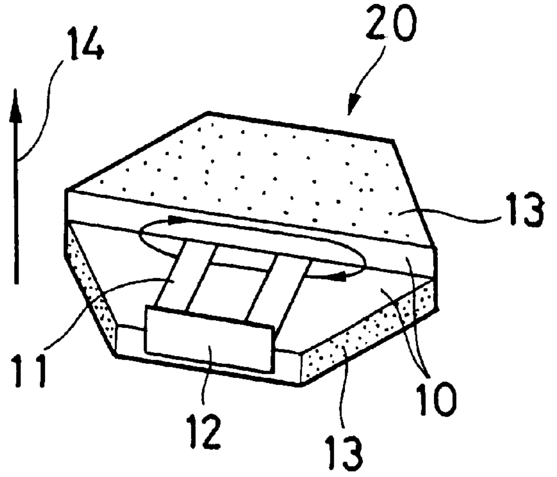
FIG. 1 is a partly cut-away perspective view illustrating schematically the construction of a magnetic rotor in a three-terminal circulator.

The present invention is now explained in further detail.

The multilayer ceramic part of the invention comprises an internal conductor layer and ceramic layers.

When the multilayer ceramic part is fabricated, a conductive paste sandwiched between ceramic material layers is fired at a temperature that is equal to or higher than the melting point of the electrical conducting material and lower than the boiling point of the electrical conducting material, thereby forming the internal conductor layer and the ceramic layers. The conductive paste is obtained by dispersing the electrical conducting material containing silver as a main component in a vehicle. Preferably in this case, a given metal oxide is further dispersed in the vehicle.

The electrical conducting material containing silver as the main component may be silver alone or a mixture of silver with other metal capable of forming a solid solution therewith, for instance, copper, gold, palladium, and platinum. When these additive metals are used, the content of silver in the electrical conducting material should be at least 70 mol %. The reason is that the amount of the mixture exceeds 30 mol %, the resistivity of the alloy is greater than that of silver. More preferably or to reduce fabrication cost increases, the amount of the additive metal mixed with silver should be up to 5 mol % (or the content of silver should be at least 95 mol %).

At least one metal oxide selected from the Ga oxide ($Ga_2O_3$), La oxide ($La_2O_3$), Pr oxide ($Pr_6O_{11}$), Sm oxide ($Sm_2O_3$), Eu oxide ($EU_2O_3$), Gd oxide ($Gd_2O_3$), Dy oxide ($Dy_2O_3$), Er oxide ($Er_2O_3$), Tm oxide ($Tm_2O_3$), and Yb oxide ($Yb_2O_3$) may be used as the metal oxide. The reason is that these metal oxides react with, and diffuse into, the ceramic material. When, in this case, the content of the metal oxide(s) per 100 parts by weight of the electrical conducting material is below 0.1 part by weight, no sufficient reaction phase is formed at the interface, resulting a silver wettability drop. At greater than 20 parts by weight, the metal oxide(s) remains in the internal conductor due to its imperfect diffusion, resulting in a conductor resistance increase. For this reason, it is preferred that the content of the metal oxide(s) is in the range of 0.1 to 20 parts by weight per 100 parts by weight of the electrical conducting material. While the electrical conducting material is not critical in terms of particle size, it should preferably have an average particle size of 0.1 to 20 μm when the conductor is formed by a screen printing process. For similar reasons, the metal oxide(s) should preferably have an average particle size of 0.1 to 20 μm.

For the vehicle, a binder such as ethyl cellulose, nitrocellulose and acrylic resin, and an organic solvent such as terpineol, butyl carbitol and hexyl carbitol may be used optionally with dispersants, activators, etc. added thereto. It is here to be noted that the vehicle content of the conductive paste should preferably be in the range of 5 to 70% by weight. It is also preferable that the conductive paste is regulated to a viscosity of about 300 to 30,000 cps (centipoise).

For the magnetic material used to form the ceramic layer, a garnet type ferrite for high-frequency purposes is generally used. The garnet type ferrite for high-frequency purposes is preferably a substituted type garnet ferrite having a fundamental composition based on YIG (yttrium-iron-garnet), specifically $Y_3Fe_5O_{12}$, to which various elements are added. If the composition of the substituted type garnet ferrite is represented by $$(Y_{3-x}\alpha_x)(Fe_{5-y}\beta_y)O_{12}$$

it is then preferable that the element α, by which Y is substituted, is at least one element of Ca, Bi, and Gd. For the purpose of property improvements in this case, it is preferable to use at least one element of Ho, Dy, and Ce as a trace additive. The element β, by which Fe is substituted, is preferably at least one element of V, Al, Ge, Ga, Sn, Zr, Ti, and In. For the purpose of property improvements in this case, it is preferable to use at least one element of Mn, Co, and Si as a trace additive. The amount of substitution is then preferably $$0 \leqq x \leqq 1.5$$

$$0 \leqq y \leqq 2$$

$$0 \leqq y \leqq 0.5$$

It is here to be noted that the atomic ratio of the trace additive used for property improvements in the above formula is usually 0.2 or less, and that the ratio, (substituent element-containing Y):(substituent element-containing Fe):O may deviate from the stoichiometric composition ratio of 3:5:12. It is also to be noted that the garnet ferrite has an average grain size of about 1 to 10 μm.

A magnetic material sheet may be formed using a magnetic paste containing a magnetic material and a vehicle.

For the vehicle, mention is made of a binder such as ethyl cellulose, polyvinyl butyral, methacrylic resin and butyl methacrylate and a solvent such as terpineol, butyl carbitol, butyl carbitol acetate, acetate, toluene, alcohol and xylene as well as various dispersants, activators, plasticizers, etc., from which any desired vehicle may be selected depending on the purpose. The amount of the vehicle added is about 65 to 85% by weight per a total of 100 parts by weight of the oxide aggregate and glass.

According to the invention, silver is added into the above magnetic paste. The content of silver in the magnetic material is up to 10% by weight, preferably up to 5% by weight, more preferably 3% by weight, and even more preferably 1% by weight. The silver, even when used in a very small amount, is found to be effective. The lower limit to the amount of silver added is not particularly specified, although the amount of silver added should not be zero. However, it is preferable that the lower limit is 0.1% by weight, and especially 0.2% by weight.

The silver in a particulate form should preferably be added into the magnetic paste. Preferably in this case, the silver should have an average particle size of 2.5 to 4.5 μm. It is here to be noted that the silver is usually present at the grain boundary after firing.

According to the invention, various multilayer ceramic parts are obtained by laminating the conductive paste and ceramic material one upon another by known processes such as a printing process or a sheet-making process to form a green laminate, and firing the laminate at a temperature that is equal to or higher than the melting point of the electrical conducting material and lower than the boiling point of the electrical conducting material. For instance, chip capacitors, chip inductors, non-reversible circuit elements (circulators, and isolators), LC filters, semiconductor capacitors, and glass ceramic multilayer boards may be fabricated.

The present invention is now explained specifically with reference to a circulator of the non-reversible circuit elements, to which the invention is preferably applied. A preferable circulator to which the invention is applied, for instance, is disclosed in U.S. Pat. No. 08/219,917 (U.S. Pat. No. 5,450,045). This circulator comprises a magnetic rotor. The magnetic rotor comprises an internal conductor, an insulating magnetic body fired integrally with the internal conductor while it is in close contact with the internal conductor and surrounds the internal conductor, a plurality of terminal electrodes electrically connected to one end of the internal conductor, a plurality of capacitors coupled to the terminal electrodes for resonance with an applied frequency, and an exciting permanent magnet for applying a direct current magnetic field on the magnetic rotor. In the circulator of this construction, no demagnetizing field is generated because a high-frequency magnetic flux forms a closed loop in the magnetic rotor due to the absence of discontinuities in the magnetic body. Accordingly, the circulator can be reduced in size and cost, and can be used at a wider band yet with reduced losses.

Figure 2:
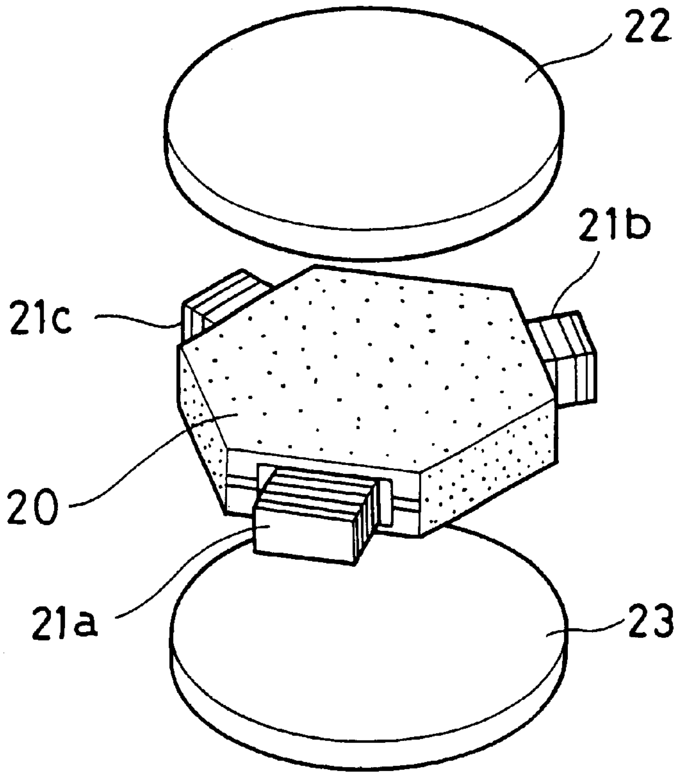
FIG. 2 is an exploded perspective view illustrating the general construction of a three-terminal circulator.
Figure 3:
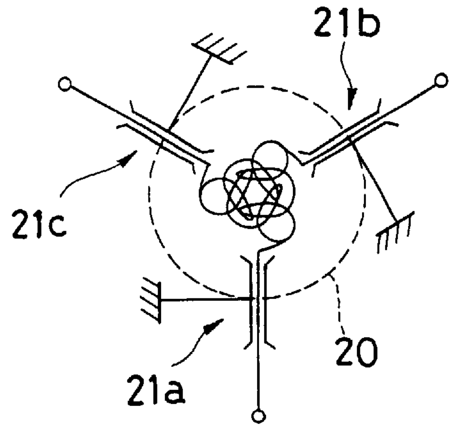
FIG. 3 is an equivalent circuit diagram for the three-terminal circulator shown in FIG. 2.
Figures 4A, 4B, 4C:
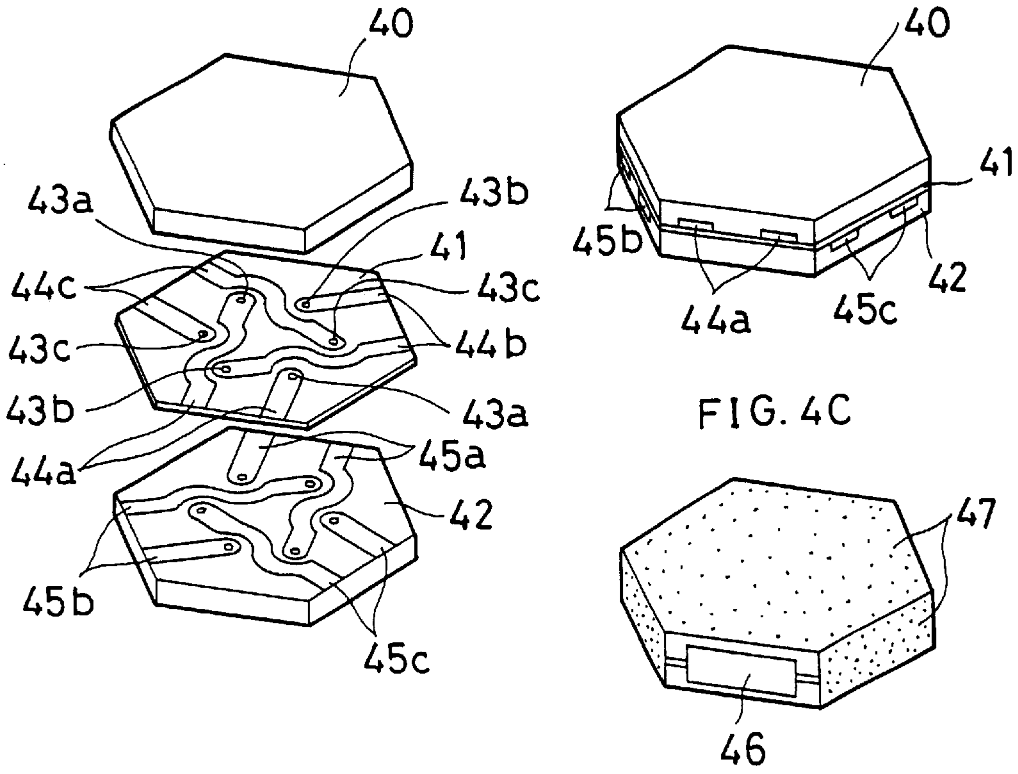
FIGS. 4A, 4B and 4C are views illustrating a part of the fabrication process of the magnetic rotor shown in FIG. 1.

FIG. 1 is a partly cut-away perspective view illustrating the construction of a magnetic rotor in a three-terminal circulator that is one example of the above circulator. FIG. 2 is an exploded perspective view illustrating the general construction of the circulator. FIG. 3 is an equivalent circuit diagram for the circulator. FIGS. 4A, 4B and 4C are views illustrating a part of the fabrication process of the magnetic rotor in the circulator.

As illustrated, this circulator is of the three-terminal type wherein a magnetic rotor 20 is of a regular hexagonal plane shape. If the magnetic rotor 20 has a structure capable of generating a uniform rotating magnetic field, however, its plane shape is not always limited to the regular hexagonal shape. In other words, the magnetic rotor may be of other hexagonal shape or a polygonal shape. By allowing the magnetic rotor to be of a polygonal plane shape, it is possible to reduce the overall size of the magnetic rotor. This is because when a circuit element such as a resonant capacitor is externally mounted on the side of the magnetic rotor, it is possible to make effective use of an available space.

In FIG. 1, reference numeral 10 stands for an integrally fired magnetic layer. An internal conductor (center conductor) 11 is formed according to a given pattern while it is surrounded with the magnetic layer 10. In this embodiment, the internal conductor 11 comprises two layers laminated one upon another. A set of two layers are each provided with a strip form of coil pattern extending in three radial directions (radial directions perpendicular to at least one side of the hexagon). The strip form of coil patterns, extending in the same direction on both layers, are electrically connected to each other by way of a via hole conductor. That is, the magnetic layer is also used as an insulator. One end of each coil pattern is electrically connected to a terminal electrode 12 formed on every other side of the magnetic layer 10. The upper and lower surfaces of the magnetic layer 10, and terminal electrode-free sides of the magnetic layer 10 are provided with ground conductors (ground electrodes) 13. The other end of each coil pattern is electrically connected to the ground conductor 13 on each of the terminal electrode-free sides of the magnetic layer.

As can be seen from FIG. 2 illustrating the general construction of the circulator, resonant capacitors 21*a*, 21*b* and 21*c* are electrically connected to three terminal electrodes (12) on a magnetic rotor 20. For these capacitors, it is preferable to use a high-frequency capacitor, e.g., a feedthrough capacitor having a high self-resonance frequency and proposed by the applicant, such as one disclosed in JP-A 5-251262. This high-frequency capacitor has a multilayer triplate-strip line structure wherein a ground conductor and a dielectric material are superposed in this order on at least one unit of multilayer member comprising a dielectric material, an internal conductor and a dielectric material superposed on a ground conductor in the described order. By use of such a feedthrough capacitor having a wide range of operating frequency, it is possible to prevent a Q value drop. It is here to be noted that the connections between the terminal electrodes and the capacitors are the same as shown in the equivalent circuit diagram attached hereto as FIG. 3.

The magnetic rotor 20 is provided on its upper and lower surfaces with exciting permanent magnets 22 and 23 (see FIG. 2) to apply a direct current magnetic field 14 (see FIG. 1) on the magnetic rotor 20.

The fabrication process of the circulator having such construction is now explained.

As shown in FIG. 4A, an upper sheet 40, an intermediate sheet 41 and a lower sheet 42, all made up of the same insulating magnetic material, are provided. Each of the upper and lower sheets 40 and 42 has usually a thickness of about 0.5 to 2 mm, and is built up of a plurality of sheeting materials laminated one upon another, each having a thickness of about 100 to 200 μm (preferably 160 μm). The intermediate sheet 41 has a thickness of about 30 to 200 μm, and preferably about 160 μm.

Via holes 43*a*, 43*b* and 43*c* are formed through the intermediate sheet 41 at given positions. At each via hole position a via hole conductor having a diameter somewhat larger than that of the via hole is provided by means of printing or transfer. For the via hole conductor, it is acceptable to use the same electrical conducting material as that of the internal conductor. However, it is preferable to use a material having a melting point higher than that of the electrical conducting material.

On the upper surface of the intermediate sheet 41 three sets of upper internal conductors 44*a*, 44*b* and 44*c* are provided according to coil patterns by the printing or transfer of internal conductor pastes. Each set comprises two strip form of patterns extending in the same radial directions (radial directions perpendicular to at least one side of the hexagon) while they sidestep the via hole portions. On the upper surface of the lower sheet 42 three similar sets of lower internal conductors 45*a*, 45*b* and 45*c* are provided in the same manner as mentioned just above. After the thus formed upper, intermediate and lower sheets 40, 41 and 42 are superposed one upon another, they are stacked together by heating and pressing. Thus, the coil patterns of thrice symmetry are located on both surfaces of the intermediate sheet 41. It is this symmetry that ensures that the propagation characteristics between the terminals of the three-terminal circulator coincide well with one another.

The upper, intermediate and lower sheets 40, 41 and 42 stacked as shown in FIG. 4B are fired together at least once at the temperature that is equal to or higher than the melting point of the electrical conducting material and lower than the boiling point of the electrical conducting material. When firing is carried out two or more times, it is required that at least one firing operation be carried out at the temperature equal to or higher than the above melting point. By this firing operation(s), the magnetic materials forming the upper, intermediate and lower sheets 40, 41 and 42 are constructed as an integral continuous member.

While the upper, intermediate and lower sheets 40, 41 and 42 have already been described as being of regular hexagonal shape with reference to FIGS. 4A and 4B, it is to be understood that after firing they are cut to prevent leakage of the electrical conducting material due to melting, because the firing operation(s) according to the invention is carried out at the temperature equal to or higher than the melting point of the electrical conducting material.

By the firing operation(s) as mentioned above, one ends of the upper internal conductors 44*a*, 44*b* and 44*c* are electrically connected to one ends of the lower internal conductors 45*a*, 45*b* and 45*c* by way of the via hole conductors in the via holes 43*a*, 43*b* and 4*c*.

After firing and cutting, each magnetic rotor is subjected to barrel polishing to expose the internal conductors on its sides, and the corners of the sintered body are chamfered. Thereafter, terminal electrodes 46 are baked onto every other sides of the magnetic rotor and ground conductors 47 are baked onto the upper and lower surfaces of the magnetic rotor as well as onto terminal electrode 46-free sides of the magnetic rotor, as shown FIG. 4C. This ensures that the other ends of the upper internal conductors 44*a*, 44*b* and 44*c* exposed on the sides of the magnetic rotor are electrically connected to the associated terminal electrodes (46), and the other ends of the lower internal conductors 45*a*, 45*b* and 45*c* exposed on the sides of the magnetic rotor are electrically connected to the ground conductors (47) on the associated sides of the magnetic rotor. Then, resonant capacitors 21*a*, 21*b* and 21*c* are mounted on the associated terminal electrodes (46) of the magnetic rotor for soldering thereto by means of reflow soldering, etc., as shown in FIG. 2. Following this, a metallic housing acting as a combination exciting permanent magnet and magnetic yoke to generate a direct current magnetic field is mounted on the assembly, thereby completing up a circulator.

While the above embodiment has been explained with reference to a three-terminal type circulator, it is to be understood that the present invention may also be applicable to a circulator having four or more terminals. Further, the present invention may be applicable to not only a lumped constant circulator such as one mentioned above but also to a distributed constant circulator wherein a magnetic rotor is integrated with a capacity circuit and an impedance transducer for making the operating frequency range wide is incorporated in a terminal circuit. Furthermore, a non-reversible circuit element such as an isolator, too, may be easily fabricated by an extension of such a circulator.

EXAMPLE

The present invention is now explained with reference to specific examples.

Example 1

Yttrium oxide ($Y_2O_3$) and iron oxide ($Fe_2O_3$) were mixed together at a molar ratio of 3:5. The powder mixture was calcined at 1,200° C. The obtained calcined powders were pulverized in a ball mill. An organic binder and a solvent were added to the powder particles with the addition of silver powders thereto in an amount of 0.2 to 5% by weight, as shown in Table 1, thereby preparing a magnetic slurry. The obtained slurry was formed into a green sheet by a doctor blade process. The green sheet was punched out by a punching machine to provide therein holes to act as via holes, followed by printing a silver conductor pattern on the green sheet by a thick-film printing process. Here and hereafter, the width of the silver conductor was a half of that referred to in WO98/05045. At the same time, the via holes were also filled with silver. For the printing paste, a paste obtained by the dispersion of silver alone, and a paste comprising silver and 3 mol % of $Ga_2O_3$ added thereto were used. Green sheets were thermally pressed to obtain a laminate. Thereafter, the laminate was fired at 1,430° C. and then cut into a given size and shape.

Figure 5A:
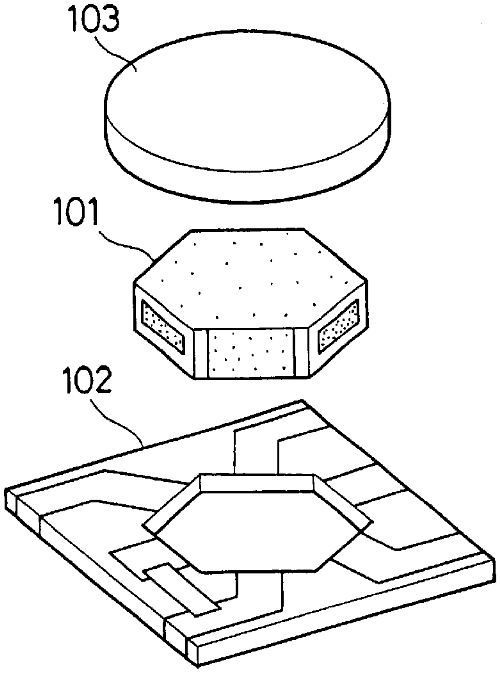
FIGS. 5A, 5B and 5C are views for illustrating the structure of one non-reversible circuit element fabricated in the examples.
Figure 5B:
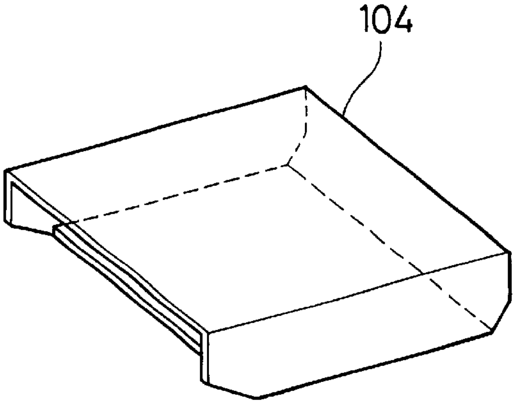
Figure 5C:
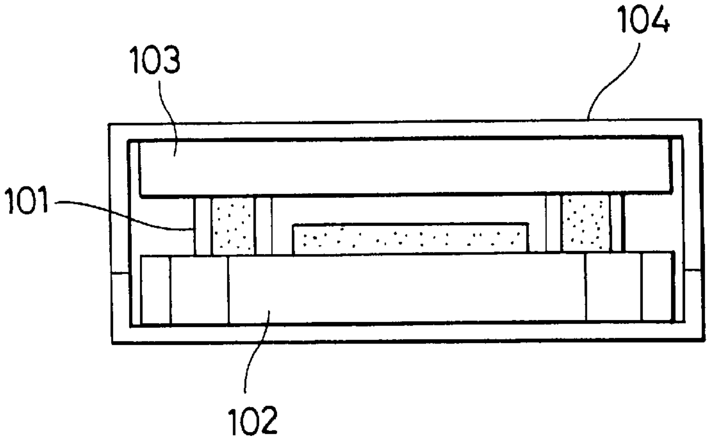

Then, silver pastes were baked onto the upper and lower surfaces of the fired laminate to form ground electrodes thereon. Further, silver pastes were baked onto the sides of the fired laminate to form electrodes for making connections between terminal electrodes and the upper and lower ground electrodes. In this way, there was obtained a magnetic rotor in which the magnetic bodies were integrated with the center conductors. A magnetic rotor 101, a capacity substrate 102, a ferrite magnet 103 and a yoke 104 were assembled together in accordance with the layouts illustrated in FIGS. 5A, 5B, and 5C. In this way, non-reversible circuit element samples were obtained (Examples 1-1 to 1-10). In Comparative Example 1, a sample was prepared as in the above examples except for no addition of silver to the magnetic material. In the above examples and comparative example as well as in the following examples and comparative examples, the capacity substrate 102, ferrite magnet 103 and yoke 104 used were the same as in the prior art. The yield of the non-reversible circuit element samples is shown in Table 1. It is here to be noted that 108 samples were prepared. The interior of each sample was observed by a transmission X-ray measuring device. An element showing breaks in the wire and failures over ⅔ of the wire width was judged as a defective. It is to be noted that the average grain size was 3.2 to 5.4 μm.

TABLE 1

| | Amount of silver added, % by weight | Addition of $Ga_2O_3$ to silver conductor | Yield, % |
|---|---|---|---|
| Example 1-1 | 0.2 | ○ | 99.1 |
| Example 1-2 | 0.5 | ○ | 97.2 |
| Example 1-3 | 1.0 | ○ | 95.3 |
| Example 1-4 | 3.0 | ○ | 94.4 |
| Example 1-5 | 5.0 | ○ | 92. 6 |
| Example 1-6 | 0.2 | X | 83.3 |
| Example 1-7 | 0.5 | X | 81.5 |
| Example 1-8 | 1.0 | X | 76.9 |
| Example 1-9 | 3.0 | X | 75.9 |
| Example 1-10 | 5.0 | X | 72.2 |
| Comp. Ex. 1 | 0.0 | ○ | 27.8 |

Example 2

Non-reversible circuit elements (Examples 2-1 to 2-10) were obtained as in Example 1 with the exception that for the oxide magnetic material, yttrium oxide ($Y_2O_3$), iron oxide ($Fe_2O_3$) and aluminum oxide ($Al_2O_3$) were mixed together at a molar ratio of 6:9:1. The amount of silver added to the magnetic material, and the yield of the non-reversible elements are shown in Table 2. The high-frequency characteristics were measured by a network analyzer.

TABLE 2

| | Amount of silver added, % by weight | Addition of $Ga_2O_3$ to silver conductor | Yield, % |
|---|---|---|---|
| Example 2-1 | 0.2 | ○ | 99.1 |
| Example 2-2 | 0.5 | ○ | 95.4 |
| Example 2-3 | 1.0 | ○ | 99.1 |
| Example 2-4 | 3.0 | ○ | 94.4 |
| Example 2-5 | 5.0 | ○ | 93.5 |
| Example 2-6 | 0.2 | X | 82.4 |
| Example 2-7 | 0.5 | X | 76.9 |
| Example 2-8 | 1.0 | X | 77.8 |
| Example 2-9 | 3.0 | X | 71.3 |
| Example 2-10 | 5.0 | X | 75.0 |
| Comp. Ex. 2 | 0.0 | ○ | 23.1 |

Example 3

Non-reversible circuit elements were obtained as in Example 1 with the exception that for the oxide magnetic material, yttrium oxide ($Y_2O_3$), iron oxide ($Fe_2O_3$), vanadium oxide ($V_2O_5$) and calcium oxide ($CaCO_3$) were mixed together at a molar ratio of 11:23:2:8.

The amount of silver added to the magnetic material, and the yield of the non-reversible elements are shown in Table 3. The high-frequency characteristics were measured by a network analyzer.

TABLE 3

| | Amount of silver added, % by weight | Addition of $Ga_2O_3$ to silver conductor | Yield, % |
|---|---|---|---|
| Example 3-1 | 0.2 | ○ | 91.7 |
| Example 3-2 | 0.5 | ○ | 88.9 |
| Example 3-3 | 1.0 | ○ | 86.1 |
| Example 3-4 | 3.0 | ○ | 81.5 |
| Example 3-5 | 5.0 | ○ | 82.4 |
| Example 3-6 | 0.2 | X | 71.3 |
| Example 3-7 | 0.5 | X | 74.1 |
| Example 3-8 | 1.0 | X | 67.6 |
| Example 3-9 | 3.0 | X | 69.4 |
| Example 3-10 | 5.0 | X | 65.7 |
| Comp. Ex. 3 | 0.0 | ○ | 22.2 |

Yields were measured as in Examples 1-1 to 1-5, 2-1 to 2-5 and 3-1 to 3-5 with the exception that $La_2O_3$, $Pr_6O_{11}$, $Sm_2O_3$, $Eu_2O_3$, $Gd_2O_3$, $Dy_2O_3$, $Er_2O_3$, $Tm_2O_3$, and $Yb_2O_3$ were used instead of $Ga_2O_3$. Equivalent effects were obtained.

From the foregoing, the effectiveness of the present invention is obvious.

What is claim is:

1. A multilayer ceramic part comprising an internal conductor layer and a ceramic layer which are formed by co-firing, wherein said internal conductor layer is formed of an electrical conducting material containing silver as a main component and said ceramic layer is formed of an yttrium-iron-garnet based oxide magnetic material with silver added thereto.

2. The multilayer ceramic part according to claim 1, wherein said silver is added to said oxide magnetic material in an amount of up to 10% by weight.

3. The multilayer ceramic part according to claim 2, wherein said silver is added to said oxide magnetic material in an amount of up to 5% by weight.

4. The multilayer ceramic part according to claim 1, wherein said internal conductor layer is formed by firing a conductive paste obtained by dispersing in a vehicle an electrical conducting material containing silver as a main component and further containing at least one metal oxide selected from a Ga oxide, an La oxide, a Pr oxide, an Sm oxide, an Eu oxide, a Gd oxide, a Dy oxide, an Er oxide, a Tm oxide, and a Yb oxide.

5. The multilayer ceramic part according to claim 4, wherein said metal oxide is contained in an amount of 0.1 to 20 parts by weight per 100 parts by weight of said electrical conducting material.

6. The multilayer ceramic part according to claim 1, wherein a firing temperature is equal to or higher than a melting point of said electrical conducting material and lower than a boiling point of said electrical conducting material.

7. The multilayer ceramic part according to claim 1, which is an non-reversible circuit element.

* * * * *